(12) United States Patent
Ryan, II et al.

(10) Patent No.: US 7,932,842 B2
(45) Date of Patent: *Apr. 26, 2011

(54) METHOD OF ENCODING DATA

(75) Inventors: Joseph M. Ryan, II, Loveland, CO (US); Joseph M. Ryan, III, Palm Beach Gardens, FL (US); Gary D. Hamor, Mead, CO (US)

(73) Assignee: Intelligent Design Systems, Inc., North Palm Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/387,382

(22) Filed: May 1, 2009

(65) Prior Publication Data
US 2009/0219178 A1    Sep. 3, 2009

Related U.S. Application Data

(62) Division of application No. 11/895,366, filed on Aug. 24, 2007, now Pat. No. 7,528,744.

(51) Int. Cl.
*H03M 7/30* (2006.01)
(52) U.S. Cl. .......................................................... 341/50
(58) Field of Classification Search ................... 341/50, 341/55, 67; 340/10.4
See application file for complete search history.

(56) References Cited

U.S. PATENT DOCUMENTS

| | | | | |
|---|---|---|---|---|
| 4,645,916 A | * | 2/1987 | Raisleger | 341/90 |
| 6,172,596 B1 | * | 1/2001 | Cesar et al. | 340/10.41 |
| 6,480,100 B1 | * | 11/2002 | Frieden et al. | 340/10.1 |
| 7,528,744 B2 | | 5/2009 | Ryan, II et al. | |
| 2006/0232384 A1 | * | 10/2006 | Yang | 340/10.2 |
| 2007/0114786 A1 | * | 5/2007 | Antonenco et al. | 283/70 |
| 2007/0276985 A1 | * | 11/2007 | Schuessler | 711/100 |

* cited by examiner

*Primary Examiner* — Howard Williams
(74) *Attorney, Agent, or Firm* — Craig R. Miles; CR Miles, P.C.

(57) ABSTRACT

A data encoder-decoder which generates an encoded data element which can be stored in and retrieved from a reduced space memory element.

21 Claims, 6 Drawing Sheets

METHOD OF ENCODING DATA

This United States Patent Application is a division of U.S. patent application Ser. No. 11/895,366, filed Aug. 24, 2007, now U.S. Pat. No. 7,528,744, issued May 5, 2009, hereby incorporated by reference herein.

I. BACKGROUND

A data encoder-decoder which generates an encoded data element which can be stored in and retrieved from a reduced space memory element.

A conventional radiofrequency identification device ("RFID device") is an object that can be attached to or incorporated into a product, animal, or person typically for the purpose of locating and identification of that object using radiowaves. Certain RFID devices can be written to and read from a distance away and do not have to be in the line of sight of a RFID device writer or reader. The current thrust in RFID device use is in supply chain management for large enterprises. RFID devices increase the speed and accuracy with which inventory can be tracked and managed thereby saving money for the business.

Conventional RFID devices (such as tags, labels, dots or the like) contain at least two parts. One is an integrated circuit for storing and processing information, modulating and demodulating a radio frequency (RF) signal and perhaps other specialized functions. The second is an antenna for receiving and transmitting the radio signal. A technology called chipless RFID allows for discrete identification of RFID devices without an integrated circuit, thereby allowing tags to be printed directly onto assets at lower cost than traditional RFID. For example, in 2006, Hitachi, Ltd. developed a passive device called the µ-Chip measuring 0.15×0.15 mm (not including the antenna), and thinner than a sheet of paper (about 7.5 micrometers) silicon-on-Insulator (SOI) technology is used to achieve this level of integration. The Hitachi µ-Chip can wirelessly transmit a 128-bit unique identification number which is hard coded into the chip as part of the manufacturing process. The unique ID in the chip cannot be altered, providing a high level of authenticity to the chip and ultimately to the items the chip may be permanently attached or embedded into. The Hitachi µ-Chip has a typical maximum read range of 30 cm (1 foot). In February 2007, Hitachi unveiled an even smaller RFID device measuring 0.05×0.05 mm, and thin enough to be embedded in a sheet of paper.

An RFID device interrogator, also referred to as a RFID reader, is an electronic device that receives the radio signal from the RFID device. In many cases, the interrogator also generates the interrogation signal. Interrogators or readers require a power supply, network connection, and antenna in order to function. Depending on application, these components may be separate or integrated. Interrogators come in various constructional forms and methods of operation.

A significant problem with RFID devices can be that the memory in which data can be stored is limited. As a non-limiting example, the 128 bit ROM above-described can only store one unique 38 digit identification number. Understandably, as the number of bits which can be encoded on a RFID increases so does the cost and the size of the RFID. Accordingly, the ROM of RFID devices utilized for tracking, locating and identification of goods remains between 100 and 200 bits and certain ROM of RFID devices include even fewer bits such as 50-100 bits ROM, or even fewer bits.

Another significant problem with RFID devices may be that there is no data encoding schema available to generate an encoded bit stream which can be stored in the limited memory space of an RFID device such as 100-200 bits which, without matching an identification number to a networked database, can provide a large amount of information relating to the product, animal, or person to which the RFID device is attached.

Similarly, even in a networked computer environment which has seemingly unlimited memory capacity, it may be preferred to organize a large amount of data whether or not relating to a product, animal, or person and whether or not utilized for location, tracking, or identification, in a reduced space memory element as further described below.

The inventive encoder-decoder system described herein addresses each of these problems by providing hardware and software and methods of using such hardware and software in various permutations and combinations.

II. SUMMARY OF THE INVENTION

Accordingly, a broad object of the invention can be to provide a data encoder system which provides a template schema by which all the possible members within a range of member values for each of a plurality of template fields of a template can be encoded as a encoded data element which can be stored in a reduced space memory element.

A second broad object of the invention can be to provide a data encoder system which allows a computer user to define all the possible member values of the members which can be established in at least one template field of a template as either a range of member values which can be established in a corresponding value based field or as a plurality of predetermined member values any of which can be established in a corresponding option based field.

A third broad object of the invention can be to provide a data encoder system which determines the fewest bits in which a member value of each of a plurality of template fields of template can be encoded into an encoded bit stream. This broad object of the invention can further include providing for each option based field a predetermined plurality of member values each matched in a table to a member value identifier. The fewest bits which can encode the member value identifier can then be encoded into the encoded bit stream.

A fourth broad object of the invention can be to provide a data encoder system which generates a table which matches the fewest number of bits determined for each one of the plurality of template fields in a template to a bit range in the encoded bit stream.

A fifth broad object of the invention can be to provide a data encoder system that can encode and decode an encoded data element as further described below. Such encoded data element providing an encoded bit stream having a plurality of bit ranges indexed to corresponding plurality of template fields with each bit range including the fewest bits which encode a member value or a member value identifier established or selected for each template field.

A sixth broad object of the invention can be to provide a data encoder system that can generate a template having a plurality of template fields each template field corresponding to a bit range of the encoded data element allowing member values to be retrieved, decoded and displayed in the template field correspondingly matched to the bit range.

Naturally, further objects of the invention are disclosed throughout other areas of the specification, drawings, photographs, and claims.

IV. DETAILED DESCRIPTION OF THE PREFERRED EMBODIMENTS

A data encoder-decoder which generates an encoded data element which can be stored in and retrieved from a reduced space memory element.

The inventive data encoder-decoder system may be described herein in terms of functional block components, screen shots, and various process steps. It should be appreciated that such functional blocks may be realized by any number of hardware or software components configured to perform the specified functions. For example, the inventive data encoder-decoder system may employ various integrated circuit components which function without limitation as memory elements, to modulate and demodulate radio frequency signal, processing elements, logic elements, look-up tables, or the like, which may carry out a variety of functions under the control of one or more microprocessors or other control devices.

Similarly, the software elements of the present invention may be implemented with any programming or scripting language such as C, C++, Java, COBOL, assembler, PERL, Labview or any graphical user interface programming language, extensible markup language (XML), Microsoft's Visual Studio .NET, Visual Basic, or the like, with the various algorithms or Boolean Logic being implemented with any combination of data structures, objects, processes, routines or other programming elements. Further, it should be noted that the present invention might employ any number of conventional wired or wireless techniques for data transmission, signaling, data processing, network control, and the like.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical data encoding-decoding system.

As will be appreciated by one of ordinary skill in the art, the present invention may be embodied as a method, a data processing system, a device for data processing, a computer program product, or the like. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, ROM, flash RAM, or the like.

The present invention may be described herein with reference to screen shots, block diagrams and flowchart illustrations of the data encoder-decoder system to describe computer programs, applications, or modules which can be utilized separately or in combination in accordance with various aspects or embodiments of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer or other programmable data processing apparatus to produce a machine, such that the instructions which execute on the computer or other programmable data processing apparatus for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware based computer systems which perform the specified functions or steps, or suitable combinations of special purpose hardware and computer instructions.

Figure 1:
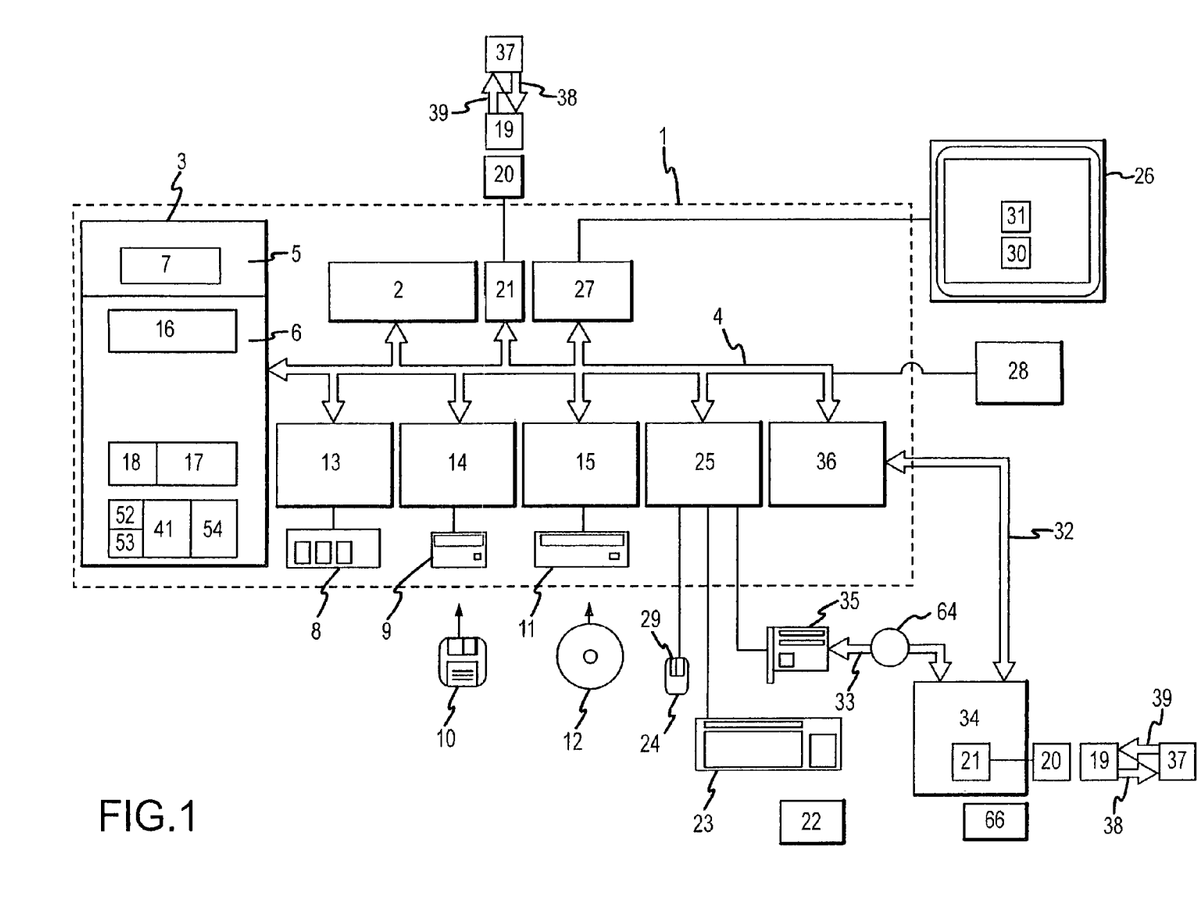
FIG. 1 is a block diagram of particular computer means and radiofrequency identification means which can be utilized to implement embodiments of the invention.

Now referring primarily to FIG. 1, which shows a block diagram of a non-limiting embodiment of a computer and related elements which can be utilized to implement embodiments of the data encoder-decoder system including, without limitation, a server computer (1) having at least one processing unit (2), a memory element (3), and a bus (4) which operably couples components of the server computer (1), including, without limitation the memory element (3) to the processing unit (2). The server computer (1) may be a conventional computer, a distributed computer, or any other type of computer which may contain all or a part of the elements described or shown to accomplish the functions described herein; the invention is not so limited. The processing unit (2) can comprise without limitation one central-processing unit (CPU), or a plurality of processing units which operate in parallel to process digital information, or a digital signal processor (DSP) plus a host processor, or the like. The bus (4) can be without limitation any of several types of bus configurations such as a memory bus or memory controller, a peripheral bus, and a local bus using any of a variety of bus architectures. The memory element (3) can without limitation be a read only memory (ROM) (5) or a random access memory (RAM) (6), or both. A basic input/output system (BIOS) (7), containing routines that assist transfer of data between the components of the server computer (1), for example during start-up, can be stored in ROM (5). The computer (1) can further include a hard disk drive (8) for reading from and writing to a hard disk (not shown) a magnetic disk drive (9) for reading from or writing to a removable magnetic disk (10), and an optical disk drive (11) for reading from or writing to a removable optical disk (12) such as a CD ROM or other optical media.

The hard disk drive (8), magnetic disk drive (9), and optical disk drive (10) can be connected to the bus (4) by a hard disk drive interface (13), a magnetic disk drive interface (14), and an optical disk drive interface (15), respectively. The drives and their associated computer-readable media provide non-volatile storage of computer-readable instructions, data structures, program modules and other data for the server computer (1). It can be appreciated by those skilled in the art that any type of computer-readable media that can store data that is accessible by a computer, such as magnetic cassettes, flash memory cards, digital video disks, Bernoulli cartridges, random access memories (RAMs), read only memories (ROMs), RFID devices or the like, may be used in the exemplary operating environment.

The server computer (1) can further include an operating system (16) and the inventive data encoder-decoder application (17) which as to certain embodiments of the invention can include a radiofrequency identification ("RFID") encoder-decoder application (18) for programming RFID data to a RFID device (19) (typically comprising a programmable microcircuit and an antenna which can be affixed to a wide variety of materials in numerous and varied constructional forms) using a RFID programmer (20) connected to the bus (4) by a RFID interface (21) may be stored on or in the hard disk, magnetic disk (10), optical disk (12), ROM (5), in RAM (6) as shown by the particular embodiment of a server computer (1) shown in FIG. 1, or alternately the functionalities of the data encoder-decoder application (17) may be implemented as an application specific integrated chip (ASIC) or file programmable gate array (FPGA), or the like.

A computer user (22) can enter commands and information into the server computer (1) through input devices such as a keyboard (23) and a pointing device (24) such as a mouse. Other input devices (not shown) may include a microphone, joystick, game pad, satellite dish, scanner, magnetic strip of a credit card, ATM card, or other form of identity card, or the like. These and other input devices are often connected to the processing unit (2) through a serial port interface (25) that can be coupled to the bus (4), but may be connected by other interfaces, such as a parallel port, game port, or a universal serial bus (USB). A monitor (26) or other type of display device can also be connected to the bus (4) via interfaces such as a video adapter (27), or the like. In addition to the monitor (26), the server computer (1) can further include a peripheral output device (28), such as speakers and printers.

A "click event" occurs when the computer user (22) operates at least one function of the data encoder-decoder application (17) or the RFID device encoder-decoder application (18), or other program or other application function, through an action or the use of a command which for example can include pressing or releasing a left mouse button (29) while a pointer element (30) is located over a control icon (31) displayed on the monitor (26). However, it is not intended that a "click event" be limited to the press and release of the left button (29) on a mouse (24) while a pointer element (30) is located over a control icon (31). Rather, the term "click event" is intend to broadly encompass any action or command by the computer user (22) through which a function of the operating system (16) or data encoder-decoder application (17), the RFID device encoder-decoder application (18), or other program or application is activated or performed, whether through clickable selection of one or a plurality of control icon(s) (31) or by computer user (22) voice command, keyboard stroke(s), mouse button, touch screen, touch pad, or otherwise. It is further intended that control icons (31) can be configured without limitation as a point, a circle, a triangle, a square (or other geometric configurations or combinations or permutations thereof), or as a check box, a drop down list, a menu, or other index containing a plurality of selectable options, an information field which can contain or which allows input of a string of alphanumeric characters such as a street address, zip code, county code, or natural area code, or by inputting a latitude/longitude or projected coordinate X and Y, or other notation, script, character, or the like.

The server computer (1) may operate in a networked environment using logical connections (32)(33) to one or a plurality of remote server computers (34). These logical connections (32)(33) are achieved by a communication device (35) (36) coupled to or a part of the server computer (1). Each of the plurality of remote server computers (34) can include a part or all of the elements above-described as included in the server computer (1) although only a single box has been illustrated in FIG. 1 for the remote server computer (34). The logical connections (32)(33) depicted in FIG. 1 can establish a local-area network (LAN) or a wide-area network (WAN). Such networking environments are commonplace in offices, enterprise-wide computer networks, intranets and the Internet (64)

When used in a LAN-networking environment, the server computer (1) can be connected to the local network through a network interface or adapter (36) type of communications device. When used in a WAN-networking environment, the server computer (1) typically includes a modem (35), a type of communications device, or any other type of communications device for establishing communications over the wide area network, such as the Internet (64). The modem (35), which may be internal or external, is connected to the bus (4) via the serial port interface (25). In a networked environment, the data encoder-decoder application (17), or portions thereof, may be stored in any one or more of the plurality of remote computers (34). It is appreciated that the logical connections (32)(33) shown are exemplary and other hardware means and communications means can be utilized for establishing a communications link between the server computer (1) and one or more of the a plurality of remote computers (35).

With respect to those embodiments of the invention which provide a RFID encoder-decoder application (18), the data encoder-decoder system can further include a RFID interface (21) and a RFID programmer (20) for programming RFID data to a RFID device(s) (19). The data encoder-decoder system can further include a plurality of RFID readers (37). The RFID reader (37) may transmit a radio-frequency carrier signal (38) to the RFID device (19). The RFID device (19)

may respond to the carrier signal (38) with a data signal (39) encoded with information stored on the RFID device (19). A numerous and wide variety of RFID components known to those of ordinary skill in the art can be made compatible with the functionalities of the data encoder-decoder application (17) described herein, as on non-limiting example, the hand held scanners available from Symbol Technologies, Inc., One Symbol Plaza, Holtsville, N.Y. 11742 and RFID tags from Alien Technology, 1830 NDSU Research Circle North, Forgo, N. Dak. 58103.

While the computer means and the network means shown in FIG. 1 can be utilized to practice the invention including the best mode, it is not intended that the description of the best mode of the invention or any preferred embodiment of the invention be limiting with respect to the utilization of a wide variety of similar, different, or equivalent computer means or network means to practice embodiments of the invention which include without limitation hand-held devices, such as personal digital assistants or camera/cell phone, multiprocessor systems, microprocessor-based or programmable consumer electronics, network PCs, minicomputers, mainframe computers, PLCs, or the like.

Figure 2:
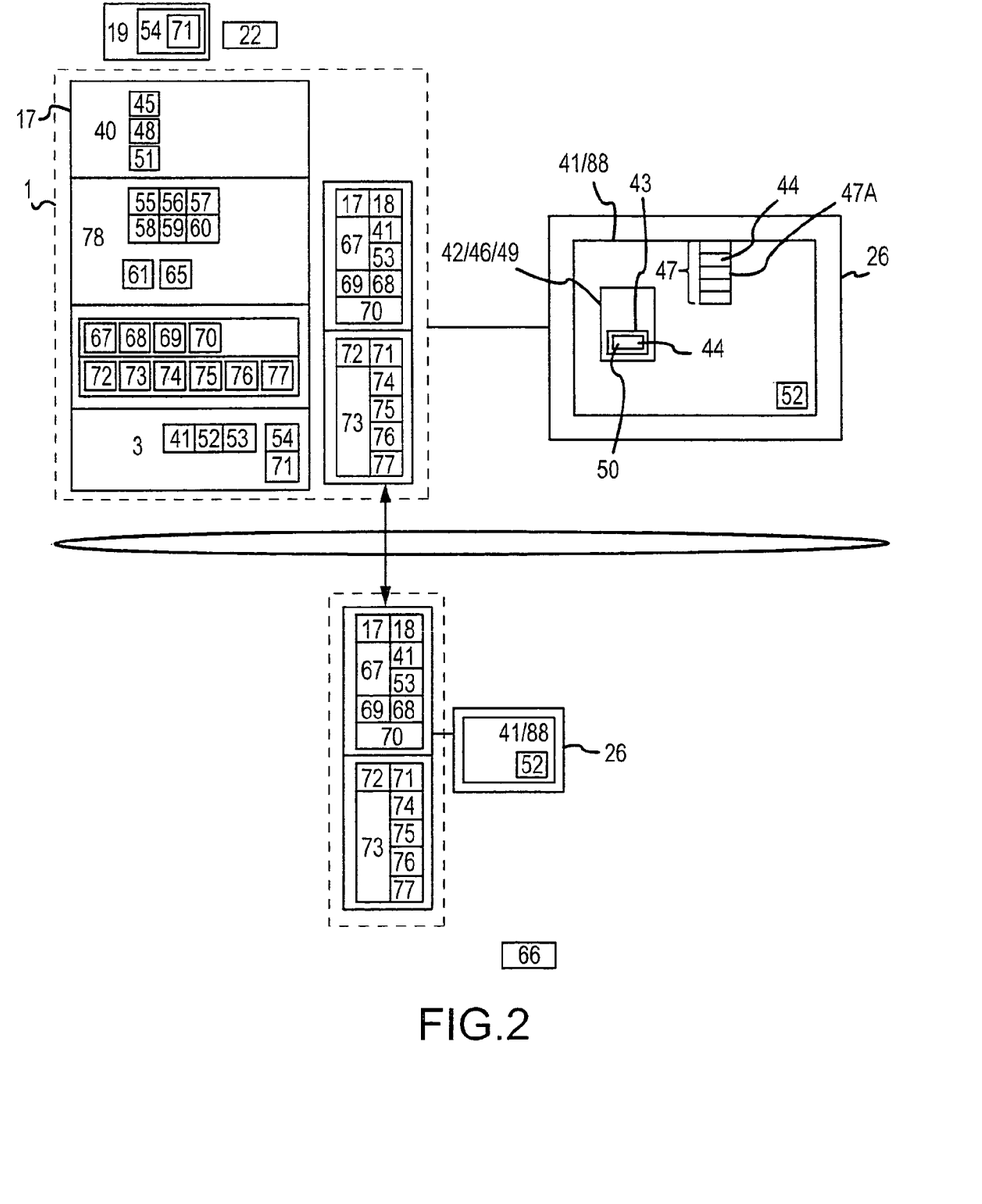
FIG. 2 is block diagram of a particular embodiment of the inventive data encoder-decoder software application.

Now referring primarily to FIGS. 1 and 2, which provides a block diagram showing a particular embodiment of the inventive data encoder-decoder application (17) which can in part include a template generator (40) which functions to generate a template (41) which can be displayed as a image on the monitor (26) and which further functions to allow the computer user (22) to generate at least one template field (42). The term "at least one template field" encompasses generation of one or more than one template field (42) in a template (41) whether an option based field (46) or a value based field (49) as further described below). The at least one template field (42) generated by the computer user (22) utilizing the functionalities of the data encoder-decoder application (17) allows the computer user (22) to define all the members (43) and the range of member values (44) which can by click event be entered into the at least one template field (42) of the template (41). The term "member (43)" as used herein means the defined one or defined plurality of data or information objects which can be entered into a particular template field (42) of the template (41). As non-limiting examples, a member can be alpha-numeric information limited to a particular format such as a serial number, a name, a calendar date, a time, or the like. Each member can be defined as having a range of member values (44) which by click event can be established in the template field (42)

In this regard, an option based field generator (45) can function to generate the at least one template field (42) as an option based field (46) which allows the computer user (22) to establish by clickable selection a member value (44) from a predetermined plurality of member values (47). As but one non-limiting example, an option based field (46) can allow the computer user (22) to create the predetermined plurality of member values (47) as a drop down list (47A) (as shown in FIG. 2) or other group of member values (44) which can be displayed as an image in the monitor (26). The computer user (22) can then by click event select one of the predetermined plurality of the member values (47) to be entered into the option based field (46).

Alternately, a value based field generator (48) can function to generate the at least one template field (42) as a value based field (49) which allows the member value (44) to be manually entered, downloaded, or otherwise established in the value based field (49) in a particular member value format (50) created by the computer user (22). As but one non-limiting example, the value based field (49) can allow the computer user (22) to create a predetermined format (50) into which an e-mail address, a calendar date, or other member value (44) in a specified range can be entered into the value based field (49). Understandably, when the number of member values (44) which can be entered into a template field (42) would make impossible, or impractical, the provision of a predetermined plurality of member values (47) (such as a drop down list) then the creation of a value based field (49) in the template may be more desirable.

The inventive data encoder-decoder application (17) can further include a template identification generator (51) which can function to couple a template identifier (52) to each template (41). The template identifier (52) can be utilized to retrieve that particular template (41) along with the coupled template schema (53) (further discussed below) from the memory element (3) or can be utilized or to match that template (41) or the particular template schema (53) to other data or applications.

Figure 3:
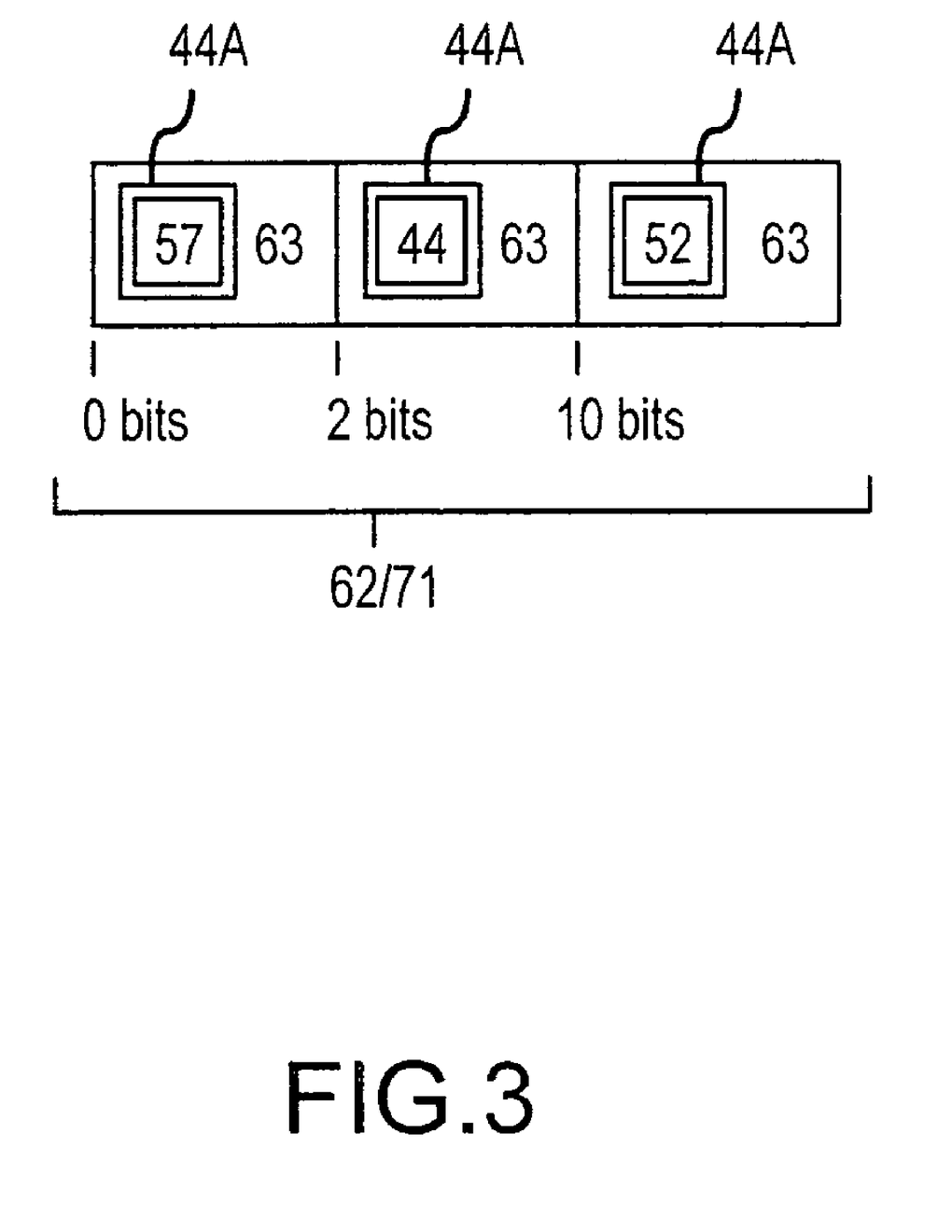
FIG. 3 is a block diagram of a particular embodiment of the inventive encoded data element.

Now referring primarily to FIGS. 1, 2, and 3, the inventive data encoder-decoder application (17) can further provide a template schema generator (78). The template schema generator (78) functions to generate the template schema (53) by which all possible member values (44) within a template (41) can be encoded for storage in a reduced amount of memory space (54) (also referred to as the "reduced space memory element") and decoded upon retrieval from the reduced space memory element (54). While examples of the reduced space memory element (54) described herein and shown in the Figures provide a small allocation of memory space such as 10 bits to 2000 bits within a memory element (3) which may have essentially unlimited memory space in the context of a networked or distributed computing environment, the meaning of a reduced space memory element (54) further encompasses the memory space available on a RFID device (19), or similar devices, that can be attached to or incorporated into a product, animal, or person for the purpose of establishing location, tracking or identification, as above described. As a non-limiting example, certain RFID devices (19) such as RFID tags, barcodes, dots, labels, or the like, may only provide a few bits of ROM memory such as 10 or 15 bits, or more conventionally provide between about 100 and about 200 bit ROM (or read-write memory) which in conventional applications may be used to store product identification numbers such as a 38 digit identification number. Depending on the constructional form of the RFID device (19) the ROM may include a greater or a lesser number of bits but in any event the ROM of an RFID device (19) will have a limited number of bits dependant on the constructional form which without alteration may not be made greater. However, any reduced space memory element (54) can be utilized with the data encoder-decoder application (17) and specifically as to the reduced space memory element (54) of RFID devices (19) can be utilized with the data encoder-decoder application (17) and the a RFID encoder-decoder application (18) to allow an amount of data to be encoded to and decoded from the reduced space memory element (54).

The template schema generator (78) can further include an option index value generator (55) which functions to generate and fill an option value index table (56) in which each of the predetermined plurality of member values (47) which can be selected or entered into an option based field (46) (or the members (43) of a plurality of option based fields (46)) can each be matched to a member value identifier (57). As a non-limiting example, if the predetermined plurality of member values (47) for a particular option based field (46)

includes five different member values (44) each can be correspondingly matched to member value identifiers (57) one to five.

The template schema generator (78) can further provide a member value permutations calculator (58) which can function to determine all the permutations of a member value identifier (57) for the predetermined plurality of member values (47) of each options based field (46) and permutations for the member value (44) which can be selected or entered into each value based field (49).

As a non-limiting example, an options based field (46) in a template (41) can provide a drop down box which contains all of the predetermined plurality of member values (47) for that options based field (46). In a particular drop down box the predetermined plurality of member values (47) may be seven. The member value permutations calculator (58) would calculate all possible member values for that particular options based field (46) as seven plus one for the possibility of a blank field for a total of eight.

Once all the permutations of a member value (44) as to each options based field (46) and as to each value based field (49) have been determined by the member value permutations calculator (58), the template schema generator (78) can further provide a member value least bits calculator (59) (also referred to as the "member value fewest bits calculator") which can function to determine the least number of bits (44A) (also referred to as the "fewest number of bits") required to encode all the permutations of a member value (44) which can be entered into a value based field (49) or permutations of the member value identifiers (57) matched to a predetermined plurality of member values (47) of an options based field (46).

For example, if an option based field (46) of a template (41) contains eight possible options, the member value least bits calculator (59) can function to calculate the least number of bits required to store one of the eight possible options as by taking the second log of the number of possible options (in this example eight possible options) and round up to the nearest whole number to obtain the least number of bits in which one of the eight options can be stored. The second log of eight is three. Accordingly, for this particular example, the member value least bits calculator (59) will indicate that three bits is required to store any one of the predetermined plurality of member values (47) for an option based field (46) having eight possible member values (44).

Now referring primarily to FIGS. 2 and 3, the template schema generator (78) can further include a least bits summator (60) which based on the determined fewest number of bits (44A) required to encode all valid permutations of the a member value identifiers (57) matched to a predetermined plurality of member values (47) of an options based field (46) and all valid member values for each value based field (49) in the template (41) created by the computer user (22) can function to add or produce a sum of the fewest bits necessary to encode the member value (44) in the at least one template field (42) of the template (41), or all the member values (44) in all the template fields (42) of the template (41) created by the computer user (22). As a non-limiting example, if the fewest number of bits (44A) calculated to digitally encode all the possible permutations of a member value (44) in a option based field (46) is four bits and the fewest number of bits (44A) calculated to encode all possible permutations of a member value (44) in a value based field (49) is 10 and these are the only the two template fields (42) in a particular template (41), then the least bits summator (60) can produce the sum of bits necessary to encode the member value (44) of the at least one field (42) in the template (41) as a total of 14 bits for an encoded bit stream (62).

Again referring primarily to FIGS. 2 and 3, the template schema generator (78) can further include a bit range generator (61) which functions to generate a bit range index (65) in which the fewest number of bits (44A) determined for the member values (44) of each template field (42) can be matched to a bit range (63) in the encoded bit stream (62). As a non-limiting example, if the least bits summator (60) determines that a total of 10 bits can provide the entire encoded bit stream (62) for the at least one field (42) of a template (41) and all the possible permutations of the member value (44) (or member value identifier (57)) of the first of the at least one template fields (42) can be encoded utilizing 2 bits of the encoded bit stream (62), the bit range generator (61) can function to allocate the required 2 bits to a particular bit range (63) of the encoded bit stream (62) (as a non-limiting example bits 0 to 2 of the 10 bit encoded bit stream (62). If all the possible permutations of the member value (44) of the second of the at least one template fields (42) can be encoded utilizing 8 bits, then the bit range generator (61) can again function to allocate the required 8 bits to a particular bit range (63) (as a non-limiting example bit 2 to bit 10). The template identifier (52) which can be a member (43) having a member value (44) of template field (42) of the template (41) and can be allocated a bit range (63) in the encoded bit stream (62), as above described.

By applying the functionalities of the template schema generator (78) as above described the template schema (53) for a particular template (41) can be generated. The template (41) can be saved to the memory element (3) coupled to the template schema (53) such that upon subsequent retrieval of the template (41) from the memory element (3) the matched or coupled template schema (53) can also be retrieved.

Again referring to FIGS. 2 and 3, the data encoder-decoder application (17) can further include a template selector (67) (which can reside in both the computer server (1) or the remote server computer (34)) which functions to allow the computer user (22) or the remote user (66) by click event to retrieve a template (41) along with the coupled template schema (53) generated as above-described. An option field member value input element (68) can function to enter one of a predetermined plurality of member values (47) selected by click event into each option based field (46) and match the selected one of the predetermined plurality of member values (47) with the corresponding member value identifier (57). Similarly, a value field member value input element (69) can function to allow member values (44) to be entered into a value based field (49). Upon establishing all the member values (44) in all of the template fields (42) of a template (41), a template member value encoder (70) can function to encode and write each member value identifier (57) and each member value (44) to the corresponding bit range (63) of the encoded bit stream (62) (including the template identifier (52)) to generate the inventive encoded data element (71) which can be stored in the reduced space memory element (54). Certain embodiments of the encoded data element (71) can be written to the reduced space memory element (54) of the memory element (3) or an RFID device (19) or other unwired device by operation of the RFID encoder-decoder application (18) which makes the encoded data element (71) compatible with a RFID programmer (20) which can transmit the encoded data element (71) to the reduced space memory element (54) of the RFID device (19).

Again referring primarily to FIGS. 2 and 3, the inventive data encoder-decoder application (17) can further include an encoded data element retrieval module (72) which functions to retrieve the encoded data element (71), whether in the form of an RFID reader (37) that can transmit a radio-frequency carrier signal (38) to the RFID device (19) to retrieve the encoded data element (71) from the RFID device (19), or from the memory element (3) of the server computer (1) or any remote server computer (34) whether in a LAN or WAN environment. As to encoded data elements (71) retrieved by an RFID reader (37), the a RFID encoder-decoder application (18) can be applied to the retrieved encoded data element (71) to provide a compatible signal on which the encoder-decoder application (17) can be applied.

The inventive data encoder-decoder application (17), can further provide a decoder module (73) which provides a bit range mapping element (74) which functions to decode the fewest number of bits encoded in each bit range (63) of the encoded data element (71) matched to each of the at least one template fields (42) of a template (41). The decoder module (71) can further provide a member value mapping element (75) which functions to match an encoded member value identifier (57) of a bit range (63) to the selected one of the predetermined plurality of member values (47) and to the corresponding option based field (46) and functions to match encoded member values (44) in a bit range (63) to the corresponding value based field (49). The decoder module (73) can further include a member value generator (76) which functions to generate the member value (44) encoded in each bit range (63). The decoder module (71) can further include a member value display generator (77) which functions to display the decoded member value in the mapped template field (42).

The inventive data encoder-decoder application (17) include a web server (65) which can serve the encoder-decoder application (17) or the RFID encoder-decoder application (18) in whole or in part to one or more remote server computers (34) through the LAN or WAN including the Internet (64).

Figure 4:
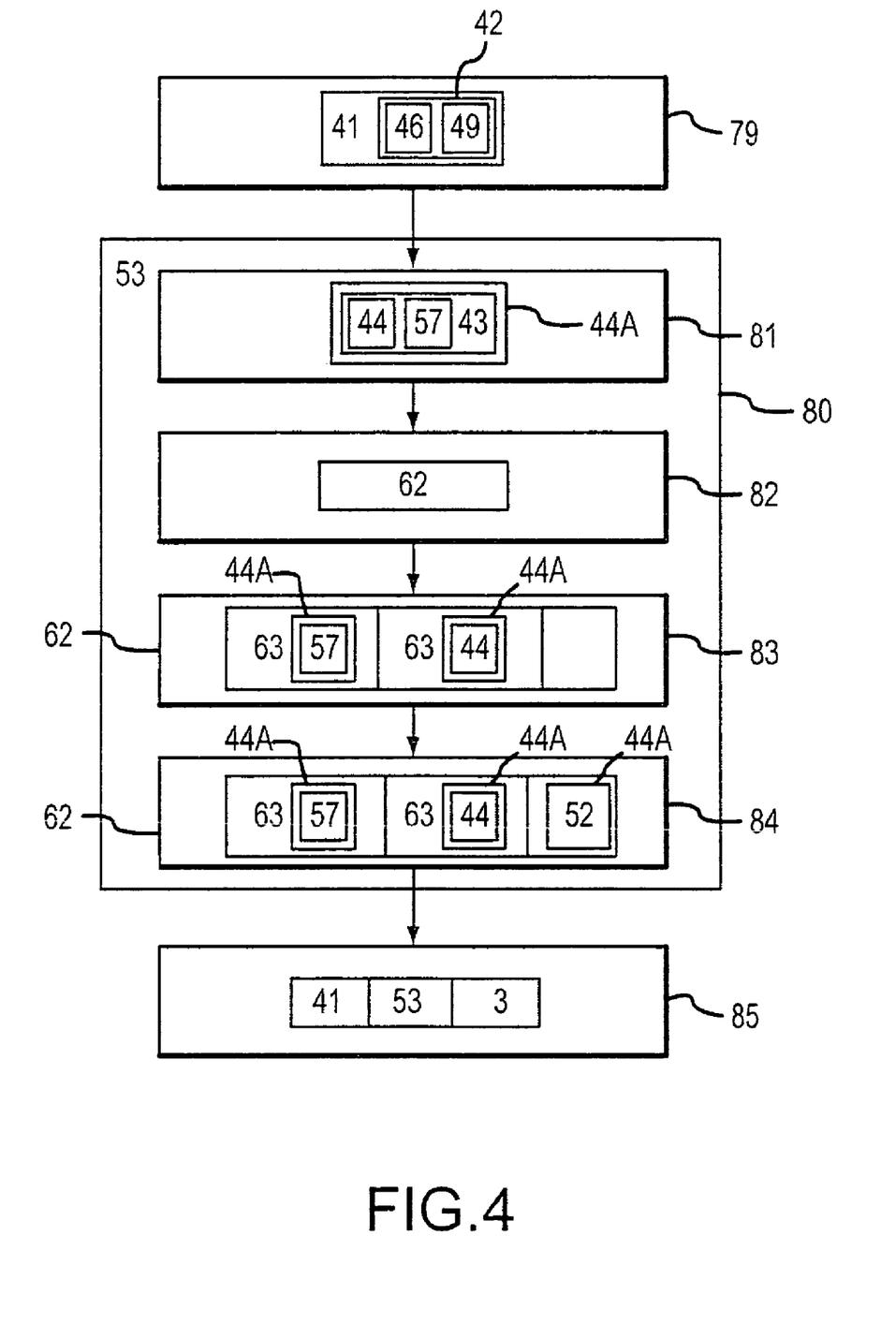
FIG. 4 is a block diagram which shows the steps of a particular embodiment of a method of using the inventive encoder-decoder software to generate a template and a template schema.

Now referring primarily to FIG. 4, a block diagram illustrates the steps of a particular method of using the inventive data encoder-decoder application (17) which can include the step of creating a template (79) by utilizing all or a part of the functionalities of the data encoder-decoder application (17). The step of creating the template (79) includes generating at least one template field (42) in a template (41) whether a value based field (49) or an option based field (46) or a plurality of each or a combination of both and characterizing as to each value based field (49) the format of the members (43) and the range of the member values (44) and characterizing for each created option based field (46) the predetermined plurality of member values (47) which may be selected for each option based field (46).

After the step of creating the template (79) which includes generating all the value based fields (49) and all the option based fields (46) which define all the members (43) and all the member values (44) which can be included in the template (41), the encoder-decoder application (17) can function in a further step (80) by generating a template schema (53) for encoding all the possible member values (44) for all of the template fields (42) of the template (41) created as above-described. The step of generating the template schema (53) can include first step (81) of determining the fewest bits (44A) to encode at least one member value (44) for at least one member (43) of at least one template field (42) in a template (41). The encoder-decoder application (17) can function by serially locating the at least one template field (42) created in the template (41). In the case of each value based field (49), the step of determining the fewest bits (44A) to encode the at least one member value (44) comprises determining all the possible member values (44) which can be included in the value based field (49) (for example, determining all the dates in a calendar range) and then determining the fewest bits (44A) to encode all the possible member values (44) which can be included in the value based field (49). In the case of each option based field (46), the step (81) of determining the fewest bits (44A) to encode a member value (44) for at least one member (43) of at least one template field (42) in a template (41) further comprises determining a least amount of bits (44A) to encode a member value identifier (57) indexed to the selected one of the plurality of predetermined member values (47).

In a further step (82), generating an encoded bit stream (62) of the sum of the fewest bits determined to encode the member value (44) for the at least one member of said at least one template field of the template (41) allocates the total number of bits required to encode all possible member values (44) for each of the at least one template field (42) of the template (41).

In a further step (83) indexing each of the fewest amount of bits (44A) to encode the member value (44) for the at least one member (43) of the at least one field (42) in said template (41) to a bit range (63) within the encoded bit stream (62). A further step (84), allows coupling of a template identifier (42) into the encoded bit stream (62). In a further step (85) storing the template schema (53) for a template (41) to a memory element (3) allows subsequent retrieval of the template schema (53) along with template (41) for encoding and decoding the encoded bit stream (62) as further described below.

Figure 5:
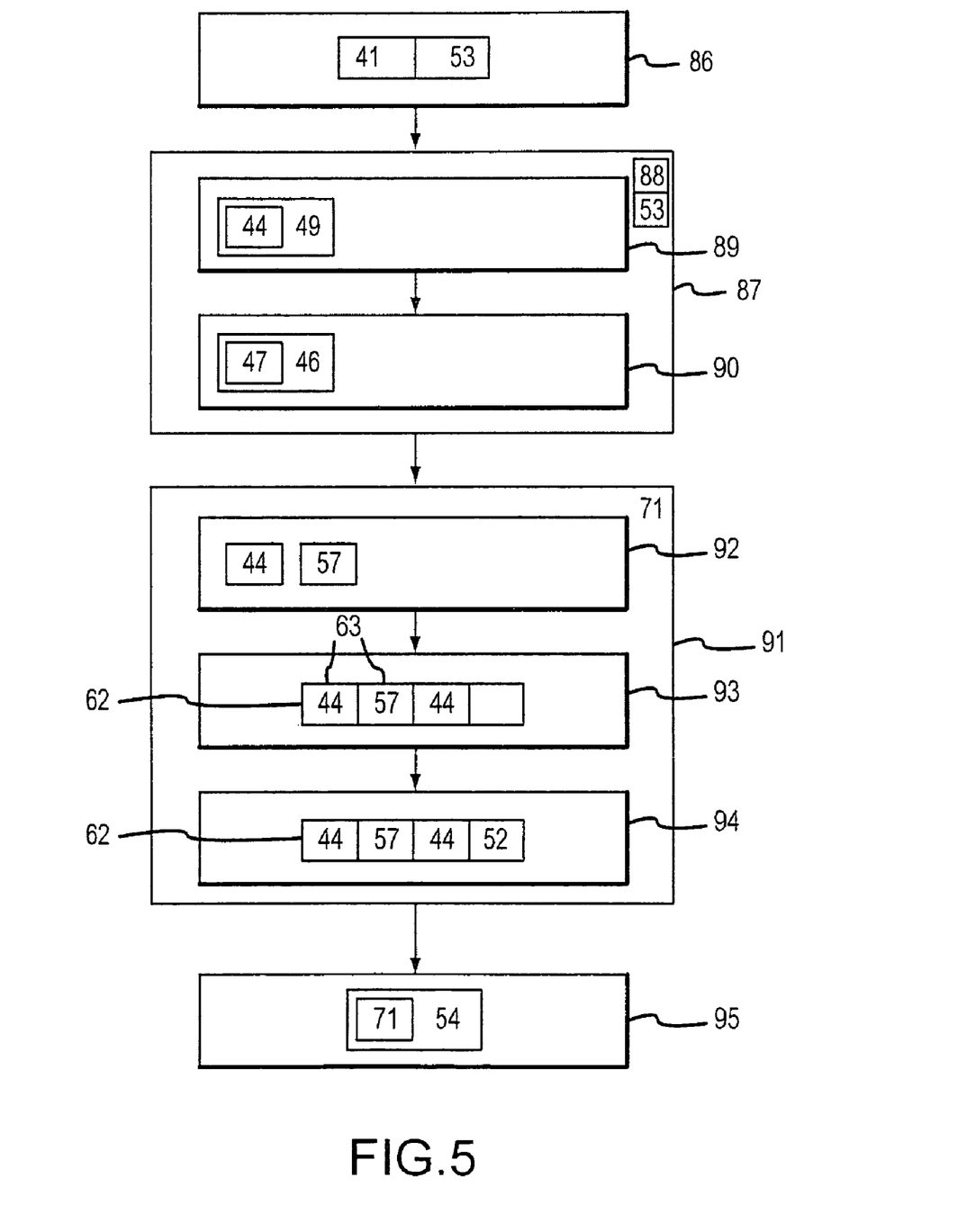
FIG. 5 is a block diagram which shows the steps of a particular embodiment of a method of using the inventive encoder-decoder software to generate a template instance to encode member values of a plurality of template fields utilizing the template schema coupled to a template.

Now, referring to FIG. 5, a block diagram illustrates the steps of a particular method of using a template (41) created by the inventive data encoder-decoder application (17) as above described. In a step (86), selecting a template by click event allows retrieval of the selected template (41) along with the coupled template schema (53) from the memory element (3) by the template generator (40) for use by the user (22) or a remote user (66). The template generator (40) can further function in this step by generating an image of the template (41) which can be displayed in the monitor (26).

In a further step (87), generating a template instance (88) can include a step (89) of entering member values (44) into each value based field (49) of the at least one template field (42) of the template (41) and a step (90) of selecting one of the predetermined plurality of member values (47) for each option based field (46) of the at least one template field (42) of the template (41). In a subsequent step (91), applying the template schema (53) coupled to the template (41) selected to the template instance (88) can generate an encoded data element (71). In generating an encoded data element the template schema operates in step (92) by determining the member value (44) for each value based field (49) and each member identifier (57) of each option based field (46) to encode into the encoded bit stream (62). The step (91) can further include the step (93) of encoding each the member values (44) and each of the member identifiers (57) into the corresponding bit ranges (63) of the encoded bit stream (62). A further step (94) allows coupling of the template identifier (52) to the encoded bit stream (62) thereby generating the encoded data element (71). In further step (95) storing the encoded data element (71) can be achieved in a reduced space memory element (54) such as the memory of a RFID device (19) as above described.

Figure 6:
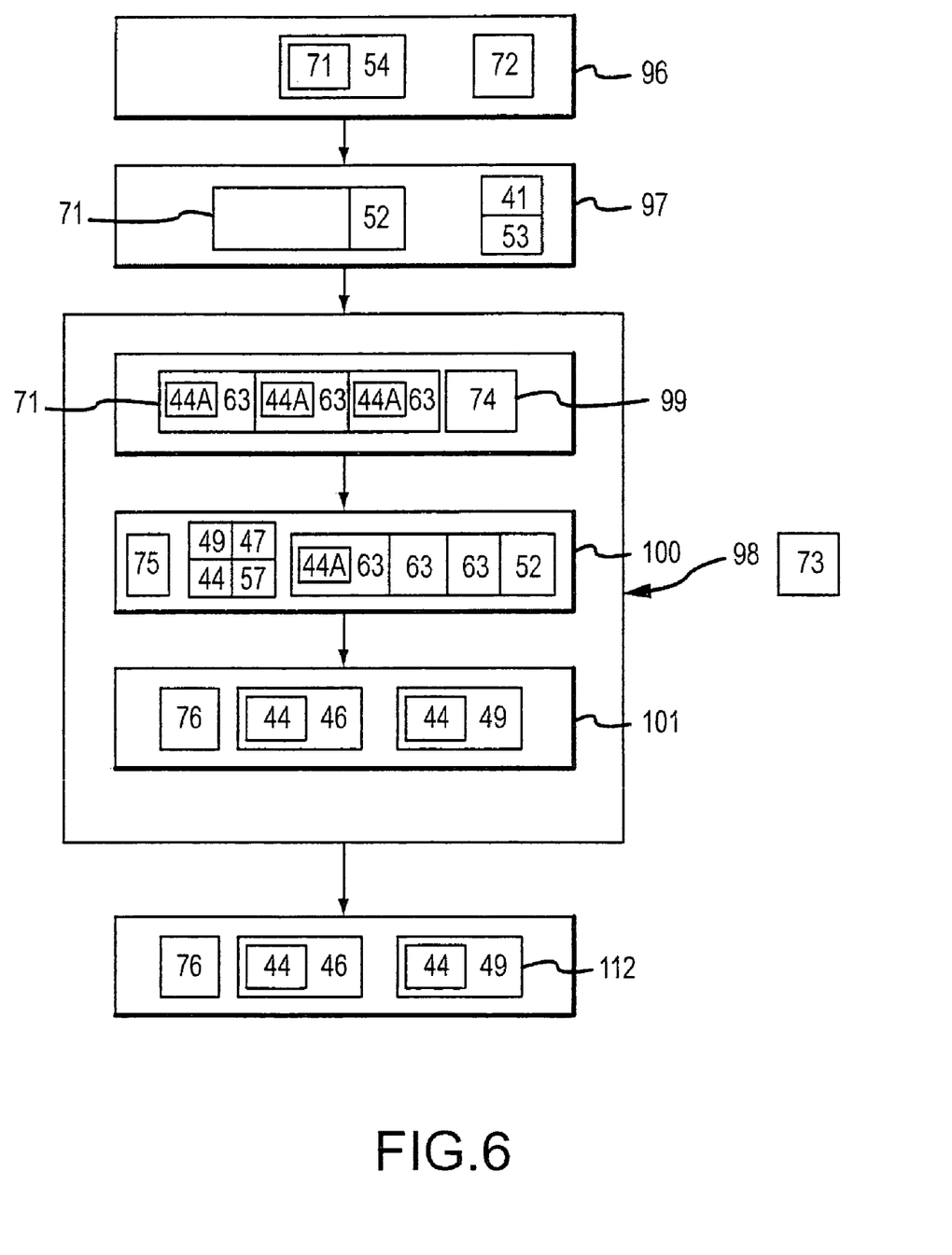
FIG. 6 is a block diagram which shows the steps of a particular embodiment of a method of using the inventive encoder-decoder to decode a encoded data element stored in a reduced space memory element to generate member values in a plurality of fields in a template.

Now referring primarily to FIG. 6, a block diagram illustrates the steps of a particular method of decoding an encoded data element (71) stored in a reduced space memory element (54). A first decoding step (96) can include retrieving the encoded data element (71) from the reduced space memory element (54) utilizing the functionalities of the encoded data element retrieval module (72) which can as to certain embodiments of the invention can comprise reading the encoded data element (71) from a RFID device (19) using one of a plurality of RFID readers (37) to obtain a data signal (39). A second decoding step (97) can include reading the template identifier (52) of the encoded data element (71) to retrieve the corresponding template (41) and coupled template schema (53) from a memory element (3) not a part of the reduced space memory element (54).

The step of decoding the encoded data element (step 98) can occur in a first step (99) of reading or parsing the fewest number of bits (44A) encoded in each bit range (63) of the encoded data element (71) utilizing the functionalities of the bit range mapping element (74). In a subsequent step (100) mapping of the fewest number of bits (44A) in each bit range (63) to member value identifiers (57) matched to one of the predetermined plurality of member values (47) of an option based field (46) and mapping of the fewest number of bit (44A) in each bit range (63) to a corresponding value based field (49) can be achieved utilizing the functionalities of the member value mapping element (75). In a subsequent step (101) of generating member values (44) for each value based field (49) and each option based field (46) can be achieved by utilizing the functionalities of the member value generator (76). In a subsequent step (102) displaying the member values (44) in each value based field (49) and each option based field (46) of a template instance (88) can be achieved utilizing the functionalities of the member value display generator (77).

As a non-limiting example of using the invention, the above-described inventive data encoder system can be used in a facilities maintenance program for a public school system to monitor maintenance of all mechanical units such as all air conditioning units in the public school system. Every air conditioning unit can have affixed an RFID tag (19) which has a reduced space memory element (54) such as an Avery AD-222 Inlay.

A remote computer user (66) which as to this example can be a maintenance technician for the public school system which has been delegated the activities related to monitoring all or a part of the air conditioner units. In providing maintenance for each of a large number of air conditioning units in the public school system, the maintenance technician (22) may be at various locations where it is impractical to obtain or is without access to a centralized database containing information relating to each of the air conditioning units through a local or wide area network. Additionally, it may be impractical, impossible, or too costly to provide each air conditioning unit with a separate high capacity data storage media or memory element.

However, the maintenance technician (66) can be provided a remote computer (34) in the form of a personal computer such as a Hewlett Packard Pavilion tx1000z which can store and serve the required functionalities of the data-encoder decoder application (18) and the RFID encoder-decoder application (18). The maintenance technician (66) can also be provided RFID programmer (20) and RFID reader (37) which can be combined in a one device such as a WJ Communications MPR 5000 which can plug into the PCMCIA slot on the personal computer (1).

At the initial set up of the maintenance technician's (66) remote computer (34), the computer user (22) can use the server computer (1) to prepare templates (41) having the necessary value based fields (49) and option based fields (46) in which member values (44) relating to each of the air conditioning units can be established along with the template identifier (52) and the template schema (53) as above-described to encode and decode the member values (44) for each value based field (49) and option based field (46). The templates (41) can be downloaded to each remote computer (34) for use by the maintenance technician (66).

The maintenance technician (66) can then as to maintenance of each air conditioning unit utilize the RFID reader (37) to read the corresponding RFID tag (19) fixed to the air conditioning unit. Based on the template identifier (52) included in the encoded data element (71) retrieved from the reduced space memory element (54) of the RFID tag (19), the data encoder-decoder application (17) can function as above described to retrieve the corresponding template (41) from a memory element (3) of the remote computer (34) and map the member values (44) to each of the value based fields (49) and option based fields (46) based on the decoded least bits (44A) encoded in each bit range (63) of the encoded data element (71) stored in the reduced space memory element (54) of the RFID device (19). The maintenance technician (66) can then, if desired, create a template instance (88) by updating the member value (44) in at least one template field (42) of the template (41). The template schema (53) coupled to the template (41) can be used to generate a encoded data element (71) with the updated member values (44) which can be stored or written to the reduce space memory element (54) of the RFID device (19) fixed to the air conditioner unit. The encoded data element (71) can also be stored locally for later synchronization with the computer server (1).

As can be easily understood from the foregoing, the basic concepts of the present invention may be embodied in a variety of ways. The invention involves numerous and varied embodiments of a data encoding system.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "diluent" should be understood to encompass disclosure of the act of "diluting"—whether explicitly discussed or not—and, conversely, were there effectively disclosure of the act of "diluting", such a disclosure should be understood to encompass disclosure of a "diluent" and even a "means for diluting." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

Thus, the applicant(s) should be understood to claim at least: i) each of the compositions or extracts herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth below are intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A method of encoding data, comprising the steps of:
   a) determining a least amount of bits to encode a member value for at least one member of at least one field in a template;
   b) generating an encodable bit stream of a sum of said least amount of bits to encode said member value for said at least one member of said at least one field in said template;
   c) indexing each of said least amount of bits to encode said member value for said at least one member of said at least one field in said template to a bit range in said encodable bit stream; and
   d) coupling a template identifier to said encodable bit stream of said sum of said least amount of bits to encode said member value for said at least one member of said at least one field in said template.

2. The method of encoding data as described in claim 1, wherein said step of determining a least amount of bits to encode a member value for at least one member of at least one field in a template further comprises the step of determining a least amount of bits to encode a member value identifier indexed to said member value for said at least one member of said at least one filed in said template.

3. The method of encoding data as described in claim 2, further comprising the step of indexing each said member value identifier to said member value for said at least one member of said at least one filed in said template.

4. The method of encoding data as described in claim 3, further comprising the step of establishing a member value for said at least one member of said at least one field in said template.

5. The method of encoding data as described in claim 4, further comprising the step of selecting said member value of said at least one member of said at least one field from a plurality of member values each indexed to said member value identifier.

6. The method of encoding data as described in claim 5, further comprising the step of encoding said member value of said at least one member established in said at least one field in said template as said least amount of bits indexed to said bit range of said encodable bit stream to generate an encoded data element.

7. The method of encoding data as described in claim 6, further comprising the step of storing said encoded data element in a memory element.

8. The method of encoding data as described in claim 7, wherein said step of storing said encoded data element in a memory comprises storing said encoded data element in a reduced space memory element.

9. The method of encoding data as described in claim 8, wherein said step of storing said encoded data element in a reduced space memory element comprises storing said encoded data element in read only memory element of a radio frequency identification device.

10. The method of encoding data as described in claim 9, wherein said read only memory element of a radio frequency identification device is selected from the group consisting of a read only memory element of between about 10 bits and about 50 bits, a read only memory element of between about 50 bits and about 100 bits, a read only memory element of between about 100 bits and about 200 bits, a read only memory element of between about 200 bits and about 500 bits, a read only memory element of between about 500 bits and about 1000 bits, and a read only memory element of between about 1000 bits and about 2000 bits.

11. An encoded data element, comprising:
   a) a bit stream of a sum of a least amount of bits to encode a member value for at least one member of at least one field in a template each said member value for at least one member of said at least one field indexed to a bit range in said bit stream; and
   b) a template identifier coupled to said sum of said least amount of bits to encode said member value for said at least one member of said at least one field in said template.

12. The encoded data element of claim 11, wherein said least amount of bits to encode a member comprises a least amount of bits to encode a member index value which can be matched to a member value in a member value index table.

13. A data encoder, comprising:
   a) a member value permutations calculator which functions to determine all member values of a member of each of a plurality of fields of a template;
   b) a member value least bits calculator which functions to determine a least amount of bits to encode all said member values of said member of each of a plurality of fields in said template;
   c) a least bits summator which functions to determine a sum of said least amount of bits to encode all member values of said member of each of said plurality of fields in said template to provide an encodable bit stream;
   d) a bit range index generator which functions to generate a bit range index which matches a bit range in said encodable bit stream to said least amount of bits to encode all member values of said member of each said plurality of fields in said template; and
   e) a template identification generator which functions to couple a template identifier to said encodable bit stream.

14. The data encoder as describe in claim 13, wherein each of said plurality of fields in said template are selected from the group consisting of an option based field and a value based field.

15. The data encoder as described in claim 14, further comprising an option index value generator which functions to index all said member values of said member of each of said option based fields in said template to a member value identifier, and wherein said member value least bits calculator further functions to determine a least amount of bits to encode all of said member value identifiers, and wherein said least bits summator further functions to determine the a sum of said least amount of bits to encode all member values of said member of each of said value based fields and encode all member identifiers indexed to said member of each of said option based fields.

16. The data encoder as described in claim 14, further comprising a template selector which functions to retrieve one of a plurality of templates from a memory element.

17. The data encoder as described in claim 16, further comprising an option based field member value input element which functions to establish said member value indexed to said member value identifier in a corresponding option based field.

18. The data encoder as described in claim 17, further comprising a value based field member value input element which functions to establish a member value in a corresponding value based field.

19. The data encoder as described in claim 18, further comprising a template schema generator which generates a template schema which encodes said member values established in each of said value based fields and each of said member value identifiers indexed to member values established in said option based fields to a corresponding bit range of said encodable bit stream to generate a encoded data element.

20. The data encoder as described in claim 19, further comprising a reduced space memory element, wherein said reduced space memory element comprises a read only memory of a radio frequency identification device.

21. The data encoder as described in claim 20, wherein said read only memory element of a radio frequency identification device is selected from the group consisting of a read only memory element of between about 10 bits and about 50 bits, a read only memory element of between about 50 bits and about 100 bits, a read only memory element of between about 100 bits and about 200 bits, a read only memory element of between about 200 bits and about 500 bits, a read only memory element of between about 500 bits and about 1000 bits, and a read only memory element of between about 1000 bits and about 2000 bits.

* * * * *